(12) United States Patent
Rajashekara

(10) Patent No.: US 6,321,145 B1
(45) Date of Patent: Nov. 20, 2001

(54) METHOD AND APPARATUS FOR A FUEL CELL PROPULSION SYSTEM

(75) Inventor: Kaushik Rajashekara, Carmel, IN (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/771,532

(22) Filed: Jan. 29, 2001

(51) Int. Cl.⁷ .................................................. B60L 11/01
(52) U.S. Cl. ............................ 701/22; 180/65.3; 429/23
(58) Field of Search .................................. 701/22; 290/9, 290/10, 13, 18, 22, 26, 31; 363/65; 429/22, 23, 24, 12, 9; 322/19, 28, 26, 45; 180/65.3, 165, 65.2, 65.1, 65.4

(56) References Cited

U.S. PATENT DOCUMENTS

| | | | |
|---|---|---|---|
| 5,991,670 | * | 11/1999 | Mufford et al. ................. 701/22 |
| 6,124,645 | * | 9/2000 | Jones et al. ..................... 290/9 |
| 6,154,381 | * | 11/2000 | Kajouke et al. ................ 363/65 |
| 6,166,934 | * | 12/2000 | Kajouke et al. ................ 363/65 |
| 6,186,254 | * | 2/2001 | Mufford et al. .............. 180/65.3 |
| 6,223,844 | * | 5/2001 | Greenhill et al. ............ 180/65.3 |
| 6,249,723 | * | 6/2001 | Latz ................................ 701/22 |
| 6,255,008 | * | 7/2001 | Iwase ............................. 429/9 |

\* cited by examiner

Primary Examiner—Richard M. Camby
(74) Attorney, Agent, or Firm—Margaret A. Dobrowitsky

(57) ABSTRACT

Propulsion control system and method are provided for use in vehicles including a propulsion motor that is powered by a fuel cell. The fuel cell unit produces a compatible voltage for the propulsion motor, thereby removing the need for a dc/dc boost converter. A buck/boost converter and a standard 12 volt battery are used to start the fuel cell. An inverter receives dc electric voltage from the fuel cell and outputs ac electric voltage to the propulsion motor. A vehicle controller receives a voltage input from the fuel cell unit and outputs a current reference to a comparing device. The comparing device compares the current reference from the vehicle controller to an actual current of the fuel cell unit and then outputs a signal to a PI control which outputs a control signal to a fuel cell controller, whereby the power output of the fuel cell is controlled based on the actual current of the fuel cell.

26 Claims, 3 Drawing Sheets

METHOD AND APPARATUS FOR A FUEL CELL PROPULSION SYSTEM

BACKGROUND OF THE INVENTION

The present invention relates to method and apparatus for operating an automobile driven by a motor having a fuel cell as an electric power source.

The paper entitled "Propulsion System Strategies for Fuel Cell Vehicles" published in SAE Congress, March 2000 is hereby incorporated for reference.

Internal combustion engines have contributed greatly to the advancement of society. Vehicles powered by these engines have shortened the travel times between us by making long distance road travel routine. Such engines, however, have also greatly contributed to the pollution of the environment. The combustion of petroleum products in these engines results in unwanted byproducts such as carbon monoxide, carbon dioxide, sulfur dioxide, nitrogen dioxide, etc., that are dumped into the atmosphere.

One such alternative energy source is electricity. In general, an electric vehicle comprises an inverter for converting the output of a direct current electric power source into a variable voltage and variable frequency alternating current.

One way to generate electricity for the vehicle is through the use of fuel cells. Fuel cells generate electric energy through the reaction of hydrogen and oxygen. The electric energy that is generated is used to drive an electric motor that, in turn, drives the wheels of the vehicle. The product of the chemical reaction in a fuel cell utilizing hydrogen and oxygen is water, a product which is essential to the environment. Naturally, there is no problem with the disposal of water.

Fuel cells extract energy by electro-chemically reacting hydrogen with oxygen, and are capable of operating for a long time since power is continuously outputted as long as fuel is supplied. The oxygen for the fuel cell reaction can typically be obtained from the ambient air while the hydrogen is obtained, for example, from a hydrogen fuel tank, a hydrogen storage device, or in a reformate stream from a catalytic reformer. The hydrogen and air for the fuel cell are handled by respective air and hydrogen supply systems that are each under the control of, for example, a programmable logic controller.

Fuel cell vehicles can be classified as Fuel Cell Electric and Fuel Cell Hybrid vehicles. A Fuel Cell Electric vehicle uses a fuel cell system as the power source without the use of a battery. Like the battery in the electric vehicles, the fuel cell system provides electricity to the drive train of the vehicle.

A Fuel Cell Hybrid vehicle has a battery or an ultracapacitor in parallel with the fuel cell system. Fuel Cell Hybrid operation enables the most efficient use of the inherently high energy density of the fuel cell and the high power density of the battery. When power demand is high, such as during acceleration, batteries provide the required power. When the power demand is low, such as during cruising, the fuel cell provides the required power. Batteries are recharged during the periods of low power operation. Thus, depending on the power and energy requirements, the fuel cell could be designed to provide cruising power and the battery could be designed to provide peak power. The selection of the battery pack would also depend on factors such as cost and performance of the fuel cell and the battery, the battery technology, and the driving cycle. The use of a battery allows rapid start-up of the fuel cell and protects it against cell reversal during operation.

In addition, the battery provides peak power, regeneration energy that can be captured, and the response time of the vehicle system for load changes is faster with the battery. A fuel cell hybrid offers good performance, long range, fast refueling, and long life.

A fuel cell vehicle system consists of three main components. The first component is a fuel processor where the fuel is converted to a hydrogen-rich gas. The second component is a fuel cell power section which consists of a stack of fuel cells where the hydrogen gas and oxidants are combined to produce direct current electricity. The third component is a heat power inverter/converter to convert the fuel cell power to ac or dc depending on the nature of the load.

If the vehicle is not operated with hydrogen, then a methanol or a gasoline reformer with a storage tank to store the fuel is needed to generate hydrogen on-board. The fuel cell, peak-power devices, motor, electronics, and fuel storage system must be designed and arranged to fit into as small a space as possible, without creating safety hazards.

One of the important parameters for the total overall efficiency of the vehicle is how fast the fuel cell system can respond to a change in the power demand. The energy consumption for the vehicle depends on the response time of the fuel cell system. Any fuel consumed during the start-up will have a negative effect on the fuel economy. If the fuel is direct pressurized hydrogen gas, a very fast response can be obtained. If an on-board methanol reformer is used, the response time is considerably longer. The response time is determined by how fast the fuel and air can be supplied to the fuel cell. The response time can vary considerably depending on the type of fuel used, type of the reformer and its construction.

The methanol reformers take a relatively long time to warm up, and cannot follow rapid changes in power demand. The response time can be up to one minute. The technology is in the development stage to have reformers with a response time of less than 100 ms. In order to decrease the response time of the reformer based system, a buffer hydrogen tank can be used to provide the required fuel during transient conditions.

However, the additional hydrogen tank adds cost, weight, and control complexity to the vehicle. Also, the sizing of the hydrogen tank could be a challenging problem. The exact amount of hydrogen needed depends on the operating conditions. It is important to make sure that there is enough hydrogen when the vehicle is accelerated. Currently, there is no infrastructure for refilling hydrogen.

Research is going on in the areas of direct methanol and direct gasoline based fuel cell stack systems. Direct reduction of methanol or gasoline in the stack reduces system complexity. It enables quick start-up for temperatures greater than 0° C. Still more development work is needed to remove carbon monoxide from the fuel cell stack. Further, the efficiency of the direct hydrogen stack is superior to a fuel cell stack that obtains hydrogen from a reformer.

A fuel cell system designed for vehicular propulsion applications must have weight, volume, power density, start-up, and transient response similar to the present day internal combustion engine based vehicles. Other requirements are: very high performance for a short time, rapid acceleration, good fuel economy, easy access and safety considerations with respect to the fuel handling. Cost and expected life-time are also very important considerations.

It would, therefore, be advantageous to have a propulsion control system where the fuel cell is controlled in a quick and efficient manner.

Therefore, it would be desirable to provide an improvement, which overcomes the aforementioned inadequacies of the prior art and provides a significant contribution to the advancement of the art of fuel cell vehicle propulsion.

Accordingly, what is needed in the art is an improved fuel cell propulsion system that is capable of responding to a wide range of output power requirements, and driving a long travel distance, by combining a storage battery and a fuel cell in an optimum usage pattern, taking full advantage of both the fuel cell and the storage battery under various operating conditions.

It would be further desirable to provide a vehicle driving system having a fuel cell power source which is reduced in size and cost, and where the fuel cell is characteristically matched to the power battery thereby eliminating the need for a DC/DC boost converter.

It would also be desirable to provide a fuel cell propulsion system where a standard 12 volt battery is used to start the vehicle through a buck/boost converter thereby eliminating the need for a power battery, and where the fuel cell unit produces a compatible voltage to the propulsion motor and a standard 12 volt battery is used to start the vehicle through a buck/boost converter thereby eliminating the need for a DC/DC boost converter and the need for a power battery.

SUMMARY OF THE INVENTION

In accordance with one aspect of the present invention, there is provided method and apparatus for operating a vehicle with an improved fuel cell propulsion system.

In one preferred embodiment of the present invention, the fuel cell propulsion system for operating a vehicle comprises a propulsion motor that is powered by a power battery and a fuel cell. The power battery and the fuel cell unit output dc electric voltage. A dc/dc boost converter receives dc electric voltage from the fuel cell unit and boosts the output dc voltage to the same level as the power battery. An inverter receives dc electric voltage from the power battery and the boosted dc electric voltage from the dc/dc boost converter and outputs ac electric voltage to the propulsion motor. A vehicle controller receives at least one electrical measurement input from the power battery. Then, the vehicle controller outputs an electrical measurement reference to a comparing device. This compares the electrical measurement reference to an actual electrical measurement from the fuel cell. The comparing device outputs a signal to the dc/dc boost converter, whereby the power output of the fuel cell remains constant.

In another exemplary embodiment of the present invention, the fuel cell propulsion system for operating a vehicle comprises a propulsion motor that is powered by a power battery and a fuel cell. The power battery and the fuel cell unit output dc electric voltage. Further, the power battery and the fuel cell unit are characteristically matched. An inverter receives dc electric voltage from the power battery and the characteristically matched fuel cell and outputs ac electric voltage to the propulsion motor. A vehicle controller receives a voltage input from the power battery. Then, the vehicle controller outputs a current reference to a comparing device which compares the current reference with an actual current of the fuel cell unit. The comparing device outputs a signal to a PI control which outputs a control signal to a fuel cell controller, whereby the power output of the fuel cell is controlled.

In another exemplary embodiment of the present invention, the propulsion control system for fuel cell powered vehicles comprises a propulsion motor that is powered by only a fuel cell. A standard 12 volt battery is used to start the fuel cell by sending dc electric voltage to a buck/boost converter. The buck/boost converter boosts the dc electric voltage from the 12 volt battery which is then used to start the fuel cell. The fuel cell then sends dc electric voltage to a dc/dc boost converter which outputs boosted dc electric voltage. An inverter receives the boosted dc electric voltage from the dc/dc boost converter and outputs ac electric voltage to the propulsion motor. A vehicle controller outputs a current reference and a voltage reference. A first comparing device receives the current reference from the vehicle controller and receives an actual current of the fuel cell unit. After comparison, the first comparing device outputs a first signal to a first PI control which outputs a first control signal to a fuel cell controller. In addition, a second comparing device receives the voltage reference from the vehicle controller and receives an actual voltage of the DC/DC boost converter. After comparison, the second comparing device outputs a second signal to a second PI control which outputs a second control signal to a PWM logic controller which is connected the dc/dc boost converter, whereby the power output of the fuel cell is maintained at a constant level.

In another exemplary embodiment of the present invention, the propulsion control system for fuel cell powered vehicles comprises a propulsion motor that is powered by only a fuel cell. In this embodiment, the fuel cell unit produces a compatible voltage for the propulsion motor, thereby eliminating the need for a dc/dc boost converter. A standard 12 volt battery is used to start the fuel cell by sending dc electric voltage to a buck/boost converter. The buck/boost converter boosts the dc electric voltage from the 12 volt battery which is then used to start the fuel cell. An inverter receives dc electric voltage from the fuel cell and outputs ac electric voltage to the propulsion motor. A vehicle controller receives a voltage input from the fuel cell unit and outputs a current reference to a comparing device. The comparing device compares the current reference from the vehicle controller to an actual current of the fuel cell unit and then outputs a signal to a PI control which outputs a control signal to a fuel cell controller, whereby the power output of the fuel cell is controlled.

An exemplary method of the present invention for propelling a vehicle comprises the steps of providing a power battery that outputs dc power battery voltage and a fuel cell unit that outputs dc electric voltage. The dc electric voltage of the fuel cell is boosted through a dc/dc boost converter and then the boosted dc electric voltage is inverted into ac voltage through an inverter. The vehicle is propelled through a propulsion motor that receives ac voltage from the inverter. At least one electrical measurement from the power battery is compared to an electrical measurement reference from a vehicle controller. Whereby, the power output of the fuel cell remains constant.

Another exemplary method of the present invention for propelling a vehicle comprises the steps of providing a dc electric power source that has a power battery and a fuel cell unit. The power battery and the fuel cell unit are characteristically matched. The dc electric voltage from the power battery and the fuel cell unit are inverted into ac voltage through an inverter. The vehicle is propelled through a propulsion motor that receives ac voltage from the inverter. A voltage input is outputted from the dc electric power source to a vehicle controller which outputs a current reference to a comparing device. The current reference from the vehicle controller is compared with an actual current of the fuel cell unit. The comparing device outputs a signal to a PI control which outputs a control signal to a fuel cell controller. Thereby controlling the power output of the fuel cell.

Another exemplary method of the present invention for propelling a vehicle comprises the steps of providing a dc electric power source through a fuel cell unit only. A standard 12 volt battery and a buck/boost converter are used to start the fuel cell. The dc electric voltage from the fuel cell unit is boosted through a dc/dc boost converter. The boosted dc electric voltage from the fuel cell unit is inverted into ac electric voltage through an inverter. The vehicle is propelled through a propulsion motor that receives ac voltage from the inverter. A vehicle controller outputs a current reference to a first comparing device. The current reference from the vehicle controller is compared with an actual current of the fuel cell unit through the first comparing device which outputs a first signal into a first PI control. The first PI control outputs a first control signal into a fuel cell controller. The fuel cell controller is connected to the fuel cell unit and controls the power output of the fuel cell based on the actual current of the fuel cell. A second comparing device compares a voltage reference from the vehicle controller with an actual voltage of the DC/DC boost converter and then outputs a second signal to a second PI control. The second PI control outputs a second control signal to a PWM logic controller which is connected to the dc/dc boost converter which allows the output power of the DC/DC boost converter to be controlled based on the voltage output of the DC/DC boost converter.

Another exemplary method of the present invention for propelling a vehicle comprises the steps of providing dc electric power through a fuel cell unit only. In this exemplary method, the fuel cell unit produces a compatible voltage to a propulsion motor. The dc electric voltage from a standard 12 volt battery is boosted through a buck/boost converter to start the fuel cell. The dc electric voltage from the fuel cell unit is inverted into ac electric voltage through an inverter. The vehicle is propelled through the propulsion motor that receives ac voltage from the inverter. A comparing device receives a current reference from a vehicle controller and compares the current reference with an actual current of the fuel cell unit. A signal is outputted from the comparing device to a PI control which outputs a control signal to a fuel cell controller. The fuel cell controller is connected to the fuel cell unit and controls the power output of the fuel cell based on the actual current of the fuel cell.

Another feature of the present invention is to provide a driving system for a vehicle capable of responding to a wide range of output power requirements, and driving a long travel distance that combines a storage battery and a fuel cell in an optimum usage pattern which takes full advantage of both the fuel cell and the storage battery under various operating conditions.

Yet another feature of the present invention is a vehicle driving system which has a fuel cell power source which is reduced in size and cost.

Another feature of the present invention is an improved fuel cell propulsion system which employs at least one signal component to control the fuel cell power output.

Still another feature of the present invention is a fuel cell propulsion system where the fuel cell is characteristically matched to the power battery thereby eliminating the need for a DC/DC boost converter.

Another feature of the present invention is a fuel cell propulsion system where a standard 12 volt battery is used to start the vehicle through a buck/boost converter thereby eliminating the need for a power battery.

Yet another feature of the present invention is a fuel cell propulsion system where the fuel cell unit produces a compatible voltage to the propulsion motor and a standard 12 volt battery is used to start the fuel cell unit through a buck/boost converter thereby eliminating the need for a DC/DC boost converter and the need for a power battery.

Still another feature of the present invention is a gas flow calculating means for calculating a required gas flow to the fuel cell for controlling the power output of the fuel cell unit.

Another feature of the present invention is a fuel cell where the output power can be regulated by controlling the flow of hydrogen.

Yet another feature of the present invention is the ability to provide additional hydrogen to the fuel cell through a buffer tank of hydrogen.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The invention will become more readily apparent from the following description of various embodiments thereof shown, by way of example only, in the accompanying drawings wherein.

Similar reference characters refer to similar parts throughout the several views of the drawings.

DETAILED DESCRIPTION OF THE INVENTION

Figure 1:
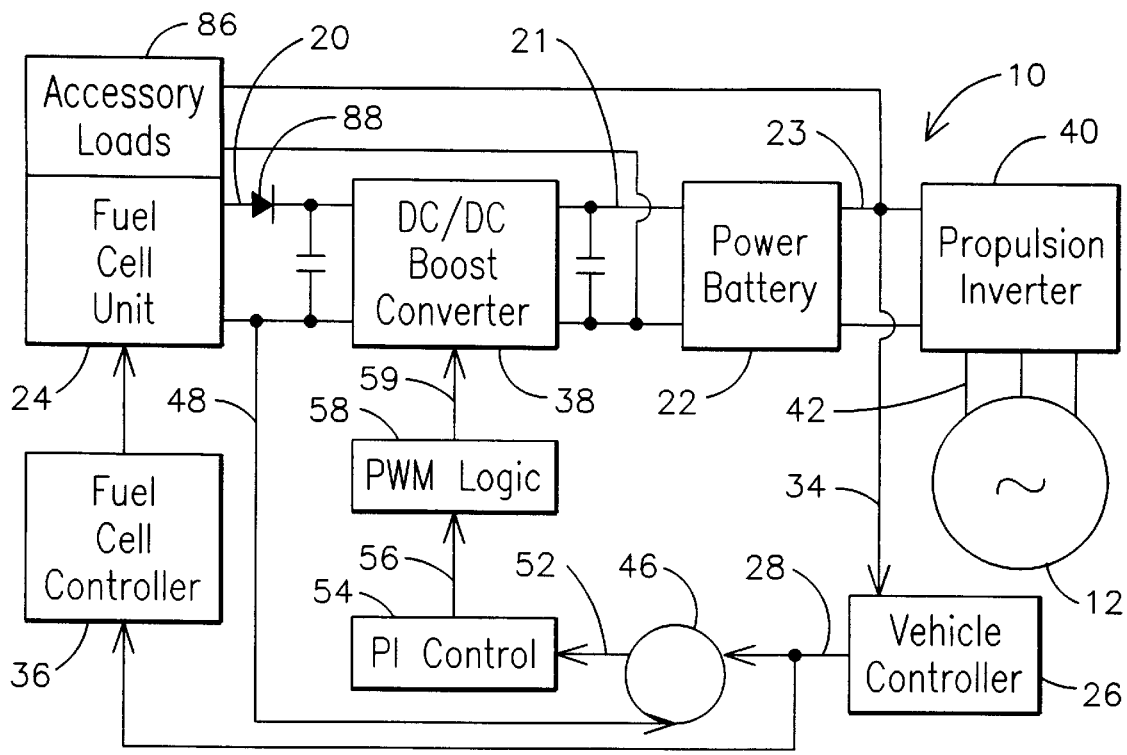
FIG. 1 is a block diagram showing an embodiment of a driving system for a vehicle in accordance with the present invention.

Reference will now be made to the drawings. FIG. 1 shows a fuel cell propulsion system 10 for operating an electric vehicle comprising a propulsion motor 12 that is powered by a power battery 22 and a fuel cell unit 24. In this system, the propulsion motor 12 is designed at a higher voltage than the fuel cell unit 24 voltage. Hence a DC/DC boost converter 38 is required to boost the fuel cell unit 24 voltage to the required voltage of about 300 Volts. The DC/DC boost converter 38 is also required to charge the power battery 22. The DC/DC boost converter 38 has to be sized based on the maximum power capability of the fuel cell unit 24.

The fuel cell unit 24 outputs dc electric voltage 20 to the DC/DC boost converter 38. The dc voltage 20 of the fuel cell unit 24 is then boosted to the same level as the power battery 22 by the DC/DC boost converter 38. A boosted dc electric voltage 21 is outputted from the DC/DC boost converter 38 to the power battery 22. A diode 88 is connected at the output of the fuel cell unit 24 in order to prevent the negative current from going into the fuel cell unit 24. If the diode is not in place then, due to the negative current, it is possible that cell reversal could occur and damage the fuel cell unit 24. Also, the ripple current seen by the fuel cell unit 24 due to the switching of the DC/DC boost converter 38 has to be low.

An inverter 40 receives dc battery voltage 23 from the power battery 22 and the boosted dc electric voltage 21 from the DC/DC boost converter 38 and outputs ac electric voltage 42 to the propulsion motor 12. A vehicle controller 26 receives a voltage input 34 from the power battery 22. The power commanded by the vehicle controller 26 is proportional to the required power and is divided by the voltage input 34 from the power battery 22 to derive a current reference 28.

Then, the vehicle controller 26 outputs the current reference 28 to a comparing device 46 which compares the current reference 28 with an actual current 48 of the fuel cell unit 24 and the error is amplified and integrated to derive the duty cycle for controlling the output power of the DC/DC converter 38. The comparing device 46 outputs a signal 52 to a PI control 54 which outputs a control signal 56 to a PWM logic controller 58. The PWM logic controller 58 compares the control signal 56 with a triangular wave. The PWM logic controller 58 outputs a gate control signal 59 to the DC/DC boost converter 38.

In this control scheme, for a constant current at the DC/DC boost converter 38 input, the fuel cell unit 24 voltage is also constant, and thus the power at the fuel cell unit 24 output remains constant. This control scheme avoids the wide variation in the fuel input to the fuel cell unit 24. In addition, it enables constant current load that is ideal for fuel cell unit 24 operation, and relatively constant power at the output of DC/DC boost converter 38 that is optimum for hybrid vehicle operation. Accordingly, the power output of the fuel cell unit 24 is controlled based on the actual current 48 of the fuel cell unit 24.

Note, if the dc electric voltage 20 of the fuel cell unit 24 voltage is higher than the dc battery voltage 23 of the power battery 22, a buck converter needs to be used instead of the dc/dc boost converter 38. However, designing a fuel cell unit 24 for higher voltages is not efficient. The power for the accessory loads 86 of the fuel cell unit 24 is derived from the power battery 22. The power battery 22 power is used to warm-up the system and bring the dc electric voltage 20 of the fuel cell unit 24 to a nominal level.

Hence, in this type of configuration, starting the fuel cell unit 24 is not a problem. A range extender type fuel cell unit 24 could be designed with low power to only charge the power battery. However, the range extender fuel cell hybrid is more like a battery operated vehicle. The battery needs to be designed to provide full power. Because of the favorable efficiency curve of the fuel cell unit 24 in the partial load range, a system with a smaller power battery and a full power fuel cell unit 24 appears to be more attractive.

Figure 2:
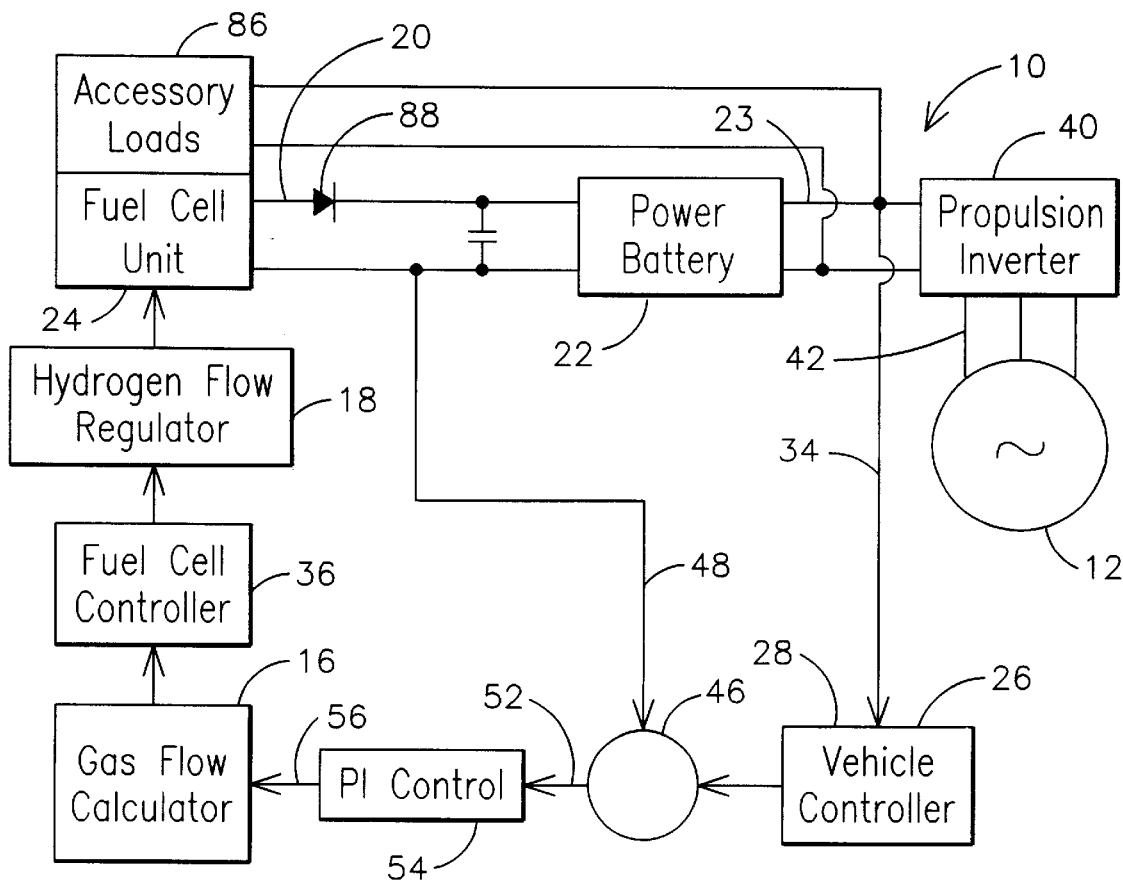
FIG. 2 is a block diagram showing an embodiment of a driving system for a vehicle in accordance with the present invention.

FIG. 2 is another embodiment of the present invention. FIG. 2 shows a fuel cell propulsion system 10 for operating a vehicle comprising a propulsion motor 12 that is powered by a power battery 22 and a fuel cell 24. The power battery 22 outputs dc power battery voltage 23 and the fuel cell unit 24 outputs dc electric voltage 20. Further, the power battery 22 and the fuel cell unit 24 are characteristically matched. In the fuel cell propulsion system 10 shown in FIG. 2, the load is shared by the fuel cell 24 and the power battery 22. The fuel cell 24 can also can be operated to fully supply the load and to charge the power battery 22. If it is a smaller battery 22, it can be used to provide mainly the peak and transient power.

An inverter 40 receives dc power battery voltage 23 from the power battery 22 and the characteristically matched dc electric voltage 20 from the fuel cell 24. The inverter 40 outputs ac electric voltage 42 to the propulsion motor 12.

A vehicle controller 26 receives a voltage input 34 from the dc power battery voltage 23. The power command from the vehicle controller 26 is divided by the dc power battery voltage 23 to derive a current reference 28 command. The vehicle controller 26 outputs the current reference 28 to a comparing device 46 which compares the current reference 28 with an actual current 48 of the fuel cell unit 24.

The comparing device 46 outputs a signal 52 to a PI control 54 which outputs a control signal 56 to a fuel cell controller 36, whereby the power output of the fuel cell 24 is controlled based on the actual current 48 of the fuel cell 24.

Since the dc electric voltage 20 of the fuel cell 24 can have a wide variation as a function of the current, it is necessary to keep the dc power battery voltage 23 stiff. A lead-acid battery may not be the right type for this kind of applications. A lithium polymer or lithium ion battery, which provides a relatively stiff voltage, is more suitable for connecting directly across the fuel cell unit 24.

The accessory loads 86 are powered by the power battery 22 voltage. Hence, no separate converter is required. The starting of the system is not a problem as the power battery 22 can provide the required starting power.

By controlling the flow of hydrogen input to the fuel cell unit 24, it is possible to adjust the power supplied by the power battery 22 and by the fuel cell 24. Further, a gas flow calculating means 16 is provided for calculating a required gas flow to the fuel cell 24 for controlling the power output of the fuel cell unit 24. The gas flow to the fuel cell 24 can be regulated by controlling the flow of hydrogen through a flow regulator 18.

Figure 3:
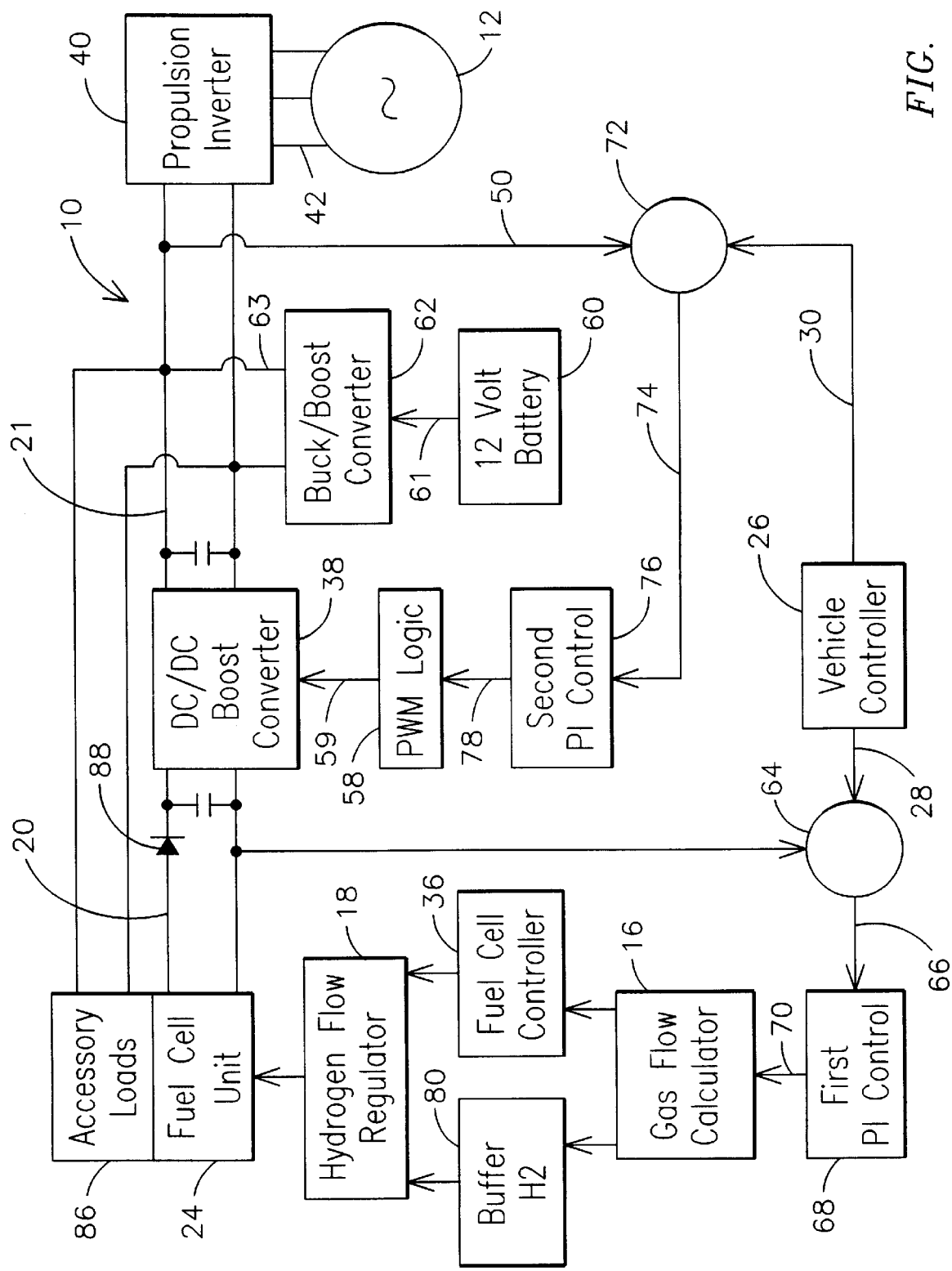
FIG. 3 is a block diagram showing an embodiment of a driving system for a vehicle in accordance with the present invention.

FIG. 3 is another embodiment of the present invention. In order to reduce the cost and weight of the fuel cell propulsion system 10, the propulsion system 10 can be configured without using a power battery as shown in FIG. 3. The fuel cell propulsion system 10 for operating a vehicle comprises a propulsion motor 12 that is powered by only a fuel cell 24. A dc/dc boost converter 38 is required to match the dc electric voltage 20 output of the fuel cell 24 to the high voltage requirement of the propulsion motor 12.

To start the fuel cell propulsion system 10, the necessary power is provided from a standard 12 volt battery 60. The standard 12 volt battery 60 outputs dc battery voltage 61 which is boosted to about 300 volts using a buck/boost converter 62. The buck/boost converter outputs buck boosted dc electric voltage 63 to start the fuel cell 24. Depending on the system 10, it may take about 15 to 20 seconds to start the fuel cell unit 24. Under normal operating conditions, the fuel cell unit 24 charges the 12 volt battery 60.

The propulsion system 10 that does not use a power battery, should have a direct hydrogen type fuel cell 24 to obtain good dynamic response. Currently, reformer technologies cannot produce the needed hydrogen fast enough to meet the sudden road load changes. However, it is possible to use a buffer tank of hydrogen 80 to meet the requirements of dynamic response.

If the hydrogen is generated using methanol or gasoline reformer, the power from the 12 volt battery 60 will not be sufficient to power the accessory loads 86 associated with the reformer and the fuel cell unit 24. The reformer needs to be heated before it can produce hydrogen. The power required is of the order of several kilowatts. In a typical system, this power may be in the range of 4 kW–6 kW. This power cannot be provided by the 12 volt battery 60. Other means of starting the reformer need to be examined.

Continuing the explanation of the current embodiment in FIG. 3, once the propulsion system 10 is started, the fuel cell unit 24 outputs dc electric voltage 20. The dc/dc boost converter 38 receives dc electric voltage 20 from the fuel cell unit 24 and outputs dc boosted dc electric voltage 21. An inverter 40 receives the boosted dc electric voltage 21 from the dc/dc boost converter 38 and outputs ac electric voltage 42 to the propulsion motor 12.

A vehicle controller 26 outputs a current reference 28 and a voltage reference 30. A first comparing device 64 receives the current reference 28 from the vehicle controller 26 and receives an actual current 48 of the fuel cell unit 24. After comparison, the first comparing device 64 outputs a first signal 66 to a first PI control 68 which outputs a first control signal 70 to a fuel cell controller 36. Accordingly, the power output of the fuel cell 24 is controlled based on the actual current 48 of the fuel cell 24.

In addition, a second comparing device 72 receives the voltage reference 30 from the vehicle controller 26 and receives the actual voltage 50 of the DC/DC boost converter 38. Then the second comparing device 72 outputs a second signal 74 to a second PI control 76 which outputs a second control signal 78 to a PWM logic controller 58 which is connected the dc/dc boost converter 38. Accordingly, the output power of the DC/DC boost converter 38 is controlled based on the actual voltage 50 of the DC/DC boost converter 38.

Figure 4:
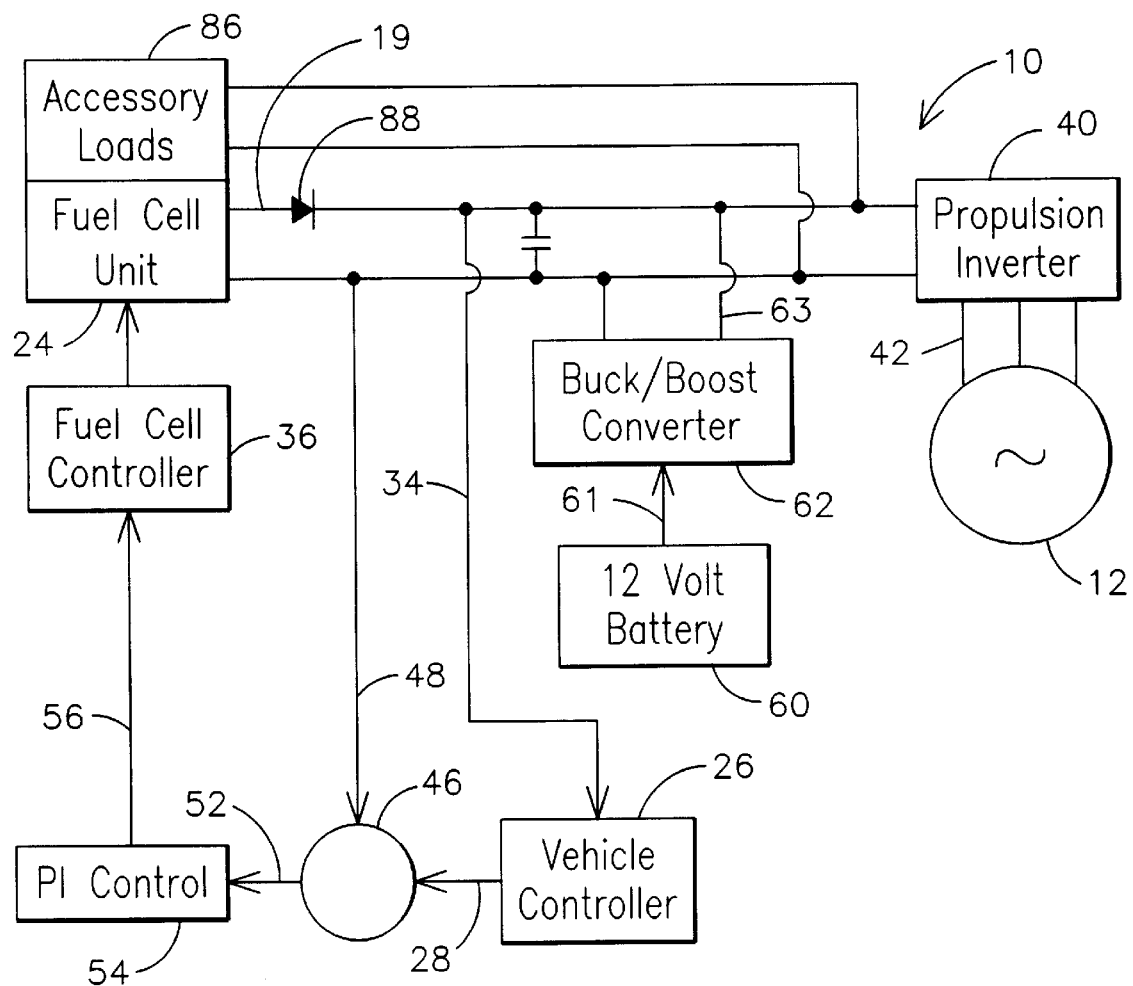
FIG. 4 is a block diagram showing an embodiment of a driving system for a vehicle in accordance with the present invention.

FIG. 4 is another embodiment of the present invention. The fuel cell propulsion system 10 can be adjusted to provide the required power without a power battery. In this configuration, the output voltage of the fuel cell 24 must be compatible with the voltage required for a propulsion motor 12. In addition, the DC/DC boost converter can also be eliminated as shown in FIG. 4. This increases the total efficiency and reduces the cost of the propulsion system 10. This is one of several exemplary configurations for a fuel cell propulsion system 10 according to the invention.

In addition, the fuel cell propulsion system 10 without the power battery pack and DC/DC boost converter is less expensive, more efficient, and has a better fuel economy due to the reduced weight of the total system. This configuration is best shown in FIG. 4, a fuel cell propulsion system 10 for operating a vehicle comprising a propulsion motor 12 that is powered by only a fuel cell 24. The fuel cell unit 24 outputs a compatible voltage 19 for the propulsion motor 12.

A standard 12 volt battery 60 outputs dc battery voltage 61. A buck/boost converter 62 receives dc battery voltage 61 from the standard 12 volt battery 60 and outputs buck boosted dc electric voltage 63 to start the fuel cell 24.

An inverter 40 receives the compatible voltage 19 from the fuel cell 24 and outputs ac electric voltage 42 to the propulsion motor 12.

A vehicle controller 26 receives a voltage input 34 from the fuel cell unit 24 and outputs a current reference 28 to a comparing device 46. The comparing device 46 compares the current reference 28 from the vehicle controller 26 to an actual current 48 of the fuel cell unit 24 and then outputs a signal 52 to a PI control 54 which outputs a control signal 56 to a fuel cell controller 36. Accordingly, the power output of the fuel cell 24 is controlled based on the actual current 48 of the fuel cell 24.

As for the motor for driving a vehicle of the present invention, a dc motor may be used instead of the ac motor. Further, means other than an inverter may be used for converting a direct current electric power source to a variable voltage, variable frequency ac power source.

The present disclosure includes that contained in the appended claims, as well as that of the foregoing description. Although this invention has been described in various exemplary forms with a certain degree of particularity, it is understood that the present disclosure of such exemplary forms has been made only by way of example and that numerous changes in the details of construction and the combination and arrangement of parts may be resorted to without departing from the spirit and scope of the invention.

Now that the invention has been described,

I claim as my invention:

1. A propulsion control system adapted for use in a fuel cell powered vehicle, said system comprising:
   a propulsion motor;
   a fuel cell unit outputting dc electric voltage;
   a power battery outputting dc power battery voltage;
   a dc/dc boost converter receiving said dc electric voltage from said fuel cell unit, said dc/dc boost converter outputting boosted dc electric voltage;
   an inverter receiving said dc power battery voltage from said power battery and said boosted dc electric voltage from said dc/dc boost converter, said inverter outputting ac electric voltage to said propulsion motor;
   a vehicle controller receiving at least one electrical measurement input from said power battery, said vehicle controller outputting an electrical measurement reference; and
   a comparing device receiving said electrical measurement reference from said vehicle controller, said comparing device receiving an actual electrical measurement from said fuel cell, said comparing device outputting a signal to said dc/dc boost converter, whereby the power output of said fuel cell remains constant.

2. The propulsion control system for fuel cell powered vehicles as described in claim 1, further comprising:
   a PI control receiving said signal of said comparing device, said PI control outputting a control signal; and
   a PWM logic controller receiving said control signal of said PI control, said PWM logic controller outputting a gate control signal to said dc/dc boost converter.

3. A propulsion control system adapted for use in a fuel cell powered vehicle, said system comprising:
   a propulsion motor;
   a fuel cell unit outputting dc electric voltage;
   a power battery outputting dc power battery voltage, said power battery and said fuel cell unit being characteristically matched;
   a fuel cell controller connected to said fuel cell unit;
   an inverter receiving said dc power battery voltage from said power battery and said dc electric voltage from said fuel cell unit, said inverter outputting ac electric voltage to said propulsion motor;
   a vehicle controller receiving a voltage input from said dc battery voltage, said vehicle controller outputting a current reference;

a comparing device receiving said current reference from said vehicle controller, said comparing device receiving an actual current from said fuel cell unit, said comparing device outputting a signal; and a PI control receiving said signal of said comparing device, said PI control outputting a control signal to said fuel cell controller, whereby the power output of said fuel cell is controlled.

4. The propulsion control system for fuel cell powered vehicles as described in claim 3, further comprising a gas flow calculating means for calculating a required gas flow to said fuel cell unit for controlling the power output of said fuel cell unit.

5. The propulsion control system for fuel cell powered vehicles as described in claim 4, wherein the output power of said fuel cell unit being regulated by controlling a flow of hydrogen inputted into said fuel cell unit.

6. A propulsion control system adapted for use in a fuel cell powered vehicle, said system comprising:

a propulsion motor;

a fuel cell unit outputting dc electric voltage;

a standard 12 volt battery outputting dc battery voltage;

a dc/dc boost converter receiving said dc electric voltage from said fuel cell unit, said dc/dc boost converter outputting boosted dc electric voltage;

a buck/boost converter receiving said dc battery voltage from said standard 12 volt battery, said buck/boost converter outputting buck boosted dc electric voltage, said buck boosted dc electric voltage from said buck/boost converter starting said fuel cell;

an inverter receiving said boosted dc electric voltage from said dc/dc boost converter, said inverter outputting ac electric voltage to said propulsion motor;

a vehicle controller outputting a current reference and a voltage reference;

a first comparing device receiving said current reference from said vehicle controller, said first comparing device receiving an actual current from said fuel cell unit, said first comparing device outputting a first signal;

a first PI control receiving said first signal of said first comparing device, said first PI control outputting a first control signal;

a fuel cell controller receiving said first control signal of said first PI control;

a second comparing device receiving said voltage reference from said vehicle controller, said second comparing device receiving an actual voltage of said boosted dc electric voltage of said dc/dc boost converter, said second comparing device outputting a second signal;

a second PI control receiving said second signal of said second comparing device, said second PI control outputting a second control signal; and a PWM logic controller receiving said second control signal from said second PI control, said PWM logic controller outputting a gate control signal to said dc/dc boost converter, whereby the power output of said fuel cell is maintained at a constant level.

7. The propulsion control system for fuel cell powered vehicles as described in claim 6, further comprising a buffer tank of hydrogen.

8. The propulsion control system for fuel cell powered vehicles as described in claim 6, further comprising a gas flow calculating means for calculating a required gas flow to said fuel cell unit for controlling the power output of said fuel cell unit.

9. The propulsion control system for fuel cell powered vehicles as described in claim 8, wherein the output power of said fuel cell unit being regulated by controlling a flow of hydrogen inputted into said fuel cell unit.

10. A propulsion control system adapted for use in a fuel cell powered vehicle, said system comprising:

a propulsion motor;

a fuel cell unit outputting a compatible dc voltage for said propulsion motor;

a standard 12 volt battery outputting dc battery voltage;

a buck/boost converter receiving said dc battery voltage from said standard 12 volt battery, said buck/boost converter outputting buck boosted dc electric voltage, said buck boosted dc electric voltage from said buck/boost converter starting said fuel cell;

an inverter receiving said compatible dc voltage from said fuel cell unit, said inverter outputting ac electric voltage to said propulsion motor;

a vehicle controller receiving a voltage input from said compatible dc voltage of said fuel cell unit, said vehicle controller outputting a current reference;

a comparing device receiving said current reference from said vehicle controller and receiving an actual current from said fuel cell unit, said comparing device outputting a signal;

a PI control receiving said signal of said comparing device, said PI control outputting a control signal; and a fuel cell controller receiving said control signal of said PI control, whereby the power output of said fuel cell is controlled.

11. The propulsion control system for fuel cell powered vehicles as described in claim 10, further comprising a buffer tank of hydrogen.

12. The propulsion control system for fuel cell powered vehicles as described in claim 10, further comprising a gas flow calculating means for calculating a required gas flow to said fuel cell stack for controlling the power output of said fuel cell unit.

13. The propulsion control system for fuel cell powered vehicles as described in claim 12, wherein the output power of said fuel cell unit being regulated by controlling a flow of hydrogen inputted into said fuel cell unit.

14. A propulsion control method adapted for use in a fuel cell powered vehicle, said method comprising:

providing a power battery that outputs dc power battery voltage;

providing a fuel cell unit that outputs dc electric voltage;

boosting said dc electric voltage through a dc/dc boost converter;

inverting said power battery voltage and said boosted dc electric voltage into ac voltage through an inverter;

propelling the vehicle through a propulsion motor that receives ac voltage from said inverter;

providing a vehicle controller which receives at least one electrical measurement from said power battery;

providing a comparing device which receives an electrical measurement reference from said vehicle controller; and outputting a signal from said comparing device to said dc/dc boost converter, whereby the power output of said fuel cell remains constant.

15. The method according to claim 14, wherein said outputted signal from said comparing device further comprising the steps of:

receiving said signal of said comparing device into a PI control;

outputting a control signal from said PI control to a PWM logic controller; and outputting a gate control signal from said PWM logic controller to said dc/dc boost converter.

16. A propulsion control method adapted for use in a fuel cell powered vehicle, said method comprising:

providing dc electric voltage through a power battery and a fuel cell unit, said power battery and said fuel cell unit being characteristically matched;

outputting a voltage input from said dc electric voltage to a vehicle controller, said vehicle controller outputting a current reference;

inverting said dc electric voltage from said power battery and said fuel cell unit into ac voltage through an inverter;

propelling the vehicle through a propulsion motor that receives ac voltage from said inverter;

comparing said current reference from said vehicle controller with an actual current of said fuel cell unit through a comparing device;

outputting a signal to a PI control from said comparing device; and outputting a control signal to a fuel cell controller from said PI control, said fuel cell controller being connected to said fuel cell unit, thereby controlling the power output of said fuel cell.

17. The method according to claim 16, further comprising the steps of calculating a required gas flow to said fuel cell unit to control the power output of said fuel cell unit through a gas flow calculating means.

18. The method according to claim 17, further comprising the steps of regulating the output power of said fuel cell unit by controlling a flow of hydrogen inputted into said fuel cell unit.

19. A propulsion control method adapted for use in a fuel cell powered vehicle, said method comprising:

providing a standard 12 volt battery that outputs dc battery voltage;

providing a fuel cell unit that outputs dc electric voltage;

boosting said dc electric voltage from said fuel cell unit through a dc/dc boost converter;

boosting said dc battery voltage from said standard 12 volt battery through a buck/boost converter;

starting said fuel cell through said boosted dc battery voltage from said standard 12 volt battery;

inverting said boosted dc electric voltage from said fuel cell unit into ac electric voltage through an inverter;

propelling the electric vehicle through a propulsion motor that receives ac voltage from said inverter;

outputting a current reference and a voltage reference from a vehicle controller;

comparing said current reference from said vehicle controller with an actual current of said fuel cell unit through a first comparing device;

outputting a first signal from said first comparing device;

inputting said first signal from said first comparing device into a first PI control;

outputting a first control signal from said first PI control into a fuel cell controller;

comparing said voltage reference from said vehicle controller with an actual voltage of said dc/dc boost converter through a second comparing device;

outputting a second signal from said second comparing device to a second PI control; and outputting a second control signal to a PWM logic controller from said second PI control, whereby the power output of said fuel cell is maintained at a constant level.

20. The method according to claim 19, further comprising the steps of supplying additional hydrogen to said fuel cell through a buffer tank of hydrogen.

21. The method according to claim 19, further comprising the steps of calculating a required gas flow to said fuel cell unit to control the power output of said fuel cell unit through a gas flow calculating means.

22. The method according to claim 21, further comprising the steps of regulating the output power of said fuel cell unit by controlling a flow of hydrogen inputted into said fuel cell unit.

23. A propulsion control method adapted for use in a fuel cell powered vehicle, said method comprising:

providing dc electric voltage through a fuel cell unit, said fuel cell unit producing a compatible voltage;

providing a standard 12 volt battery that outputs dc battery voltage;

boosting said dc battery voltage from said standard 12 volt battery through a buck/boost converter;

starting said fuel cell through said boosted dc battery voltage from said standard 12 volt battery;

inverting said dc electric voltage from said fuel cell unit into ac electric voltage through an inverter;

propelling the vehicle through a propulsion motor that receives ac voltage from said inverter;

outputting a current reference from a vehicle controller;

inputting a voltage reference into said vehicle controller from said fuel cell unit;

comparing said current reference from said vehicle controller with an actual current of said fuel cell unit through a comparing device;

outputting a signal to a PI control from said comparing device; and outputting a control signal to a fuel cell controller from said PI control, said fuel cell controller being connected to said fuel cell unit, whereby the power output of said fuel cell is controlled.

24. The method according to claim 23, further comprising the steps of supplying additional hydrogen to said fuel cell through a buffer tank of hydrogen.

25. The method according to claim 23, further comprising the steps of calculating a required gas flow to said fuel cell unit to control the power output of said fuel cell unit through a gas flow calculating means.

26. The method according to claim 25, further comprising the steps of regulating the output power of said fuel cell unit by controlling a flow of hydrogen inputted into said fuel cell unit.

* * * * *